US011662587B2

(12) United States Patent
Matsumoto et al.

(10) Patent No.: US 11,662,587 B2
(45) Date of Patent: May 30, 2023

(54) VIRTUAL IMAGE DISPLAY DEVICE

(71) Applicant: SEIKO EPSON CORPORATION, Tokyo (JP)

(72) Inventors: Daiki Matsumoto, Suwa (JP); Masatoshi Yonekubo, Nagano (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

(21) Appl. No.: 17/218,199

(22) Filed: Mar. 31, 2021

(65) Prior Publication Data
US 2021/0302743 A1   Sep. 30, 2021

(30) Foreign Application Priority Data

Mar. 31, 2020   (JP) .............................. JP2020-062278

(51) Int. Cl.
*G02B 27/01*   (2006.01)

(52) U.S. Cl.
CPC .. *G02B 27/0172* (2013.01); *G02B 2027/0178* (2013.01)

(58) Field of Classification Search
CPC ........ G02B 27/0172; G02B 2027/0178; G02B 2027/017; G02B 2027/0172; G02B 2027/0179
See application file for complete search history.

(56) References Cited

U.S. PATENT DOCUMENTS

| | | | | |
|---|---|---|---|---|
| 6,023,373 A | * | 2/2000 | Inoguchi | G02B 27/0172 349/11 |
| 2002/0163734 A1 | * | 11/2002 | Inoguchi | G02B 27/144 359/627 |
| 2008/0180596 A1 | * | 7/2008 | Fujimoto | G02B 27/0172 349/62 |
| 2009/0009846 A1 | * | 1/2009 | Destain | G02B 13/18 359/708 |
| 2012/0200937 A1 | * | 8/2012 | Totani | G02B 27/0172 359/631 |

(Continued)

FOREIGN PATENT DOCUMENTS

| | | |
|---|---|---|
| JP | H11237584 | 8/1999 |
| JP | 2020008749 | 1/2020 |

*Primary Examiner* — Towfiq Elahi
(74) *Attorney, Agent, or Firm* — JCIPRNET

(57) ABSTRACT

A virtual image display device includes an image light generation device, a projection optical system configured to project image light emitted from the image light generation device, a folding mirror configured to reflect the image light from the projection optical system, a semi-transmissive mirror configured to reflect part of the image light from the folding mirror, and a concave surface mirror configured to reflect, the image light reflected by the semi-transmissive mirror to form an exit pupil, wherein an optical axis of the projection optical system is arranged in a direction intersecting a reference plane including an optical axis extending from the folding mirror to the semi-transmissive mirror and an optical axis extending from the concave surface mirror to the exit pupil, and a display region of the image light generation device is arranged inclined in accordance with inclinations of the folding mirror and the semi-transmissive mirror that are arranged.

10 Claims, 11 Drawing Sheets

(56) References Cited

U.S. PATENT DOCUMENTS

| | | | |
|---|---|---|---|
| 2015/0160460 A1* | 6/2015 | Komatsu | G02B 17/0856 |
| | | | 359/629 |
| 2017/0115485 A1* | 4/2017 | Saito | G03B 21/142 |
| 2018/0017792 A1* | 1/2018 | Takazawa | G02B 17/008 |
| 2019/0084419 A1* | 3/2019 | Suzuki | G02B 27/0101 |
| 2020/0018966 A1 | 1/2020 | Komatsu et al. | |

* cited by examiner

VIRTUAL IMAGE DISPLAY DEVICE

The present application is based on, and claims priority from JP Application Serial Number 2020-062278, filed Mar. 31, 2020, the disclosure of which is hereby incorporated by reference herein in its entirety.

BACKGROUND

1. Technical Field

The present disclosure relates to a virtual image display device such as a head-mounted display, and more particularly relates to a virtual image display device of a type in which a semi-transmissive reflection surface is used, image light enters a concave surface mirror, and light reflected from the concave surface mirror is observed.

2. Related Art

As a virtual image display device including a semi-transmissive reflection surface and a concave surface mirror, for example, there exists a device including a prism member in which a semi-transmissive reflection surface is embedded (see JP-A-2020-008749). It is described that, in this device, image light entering the prism member is totally reflected at a total reflection surface of the prism member, and is guided toward the semi-transmissive reflection surface, and that the image light is reflected at the semi-transmissive reflection surface toward a light condensing reflection surface arranged in front of the prism member. In this virtual image display device, the image light emitted from a display device along a lateral direction is bent by a prism mirror accompanying a projection optical member, and is caused to enter the prism member arranged below.

In the virtual image display device in JP-A-2020-008749, two prisms are required to be bonded in such a way that a surface on an external side and a surface on a user side are parallel to each other in the prism member. In some cases, an optical system is increased in weight, or a concave surface mirror part bulges out with a large thickness because the concave surface mirror is required to be arranged on the external side of the prism member.

Moreover, in the virtual image display device in which the semi-transmissive reflection surface and the concave surface mirror are combined, in response to a demand for size reduction and stylish appearance, inclination of the semi-transmissive reflection surface is required to be adjusted to a desired degree, or an optical axis of a projection optical system is required to be bent in a desired direction in such a way as to intersect a vertical plane including a center optical axis of the concave surface mirror, in some cases. In those cases, inclination or rotation of image light is possibly caused, which is why correction is required to display an image without inclination.

SUMMARY

A virtual image display device according to one aspect of the present disclosure includes an image light generation device, a projection optical system configured to project image light emitted from the image light generation device, a folding mirror configured to reflect the image light from the projection optical system, a semi-transmissive mirror configured to reflect or transmit part of the image light from the folding mirror, and a concave surface mirror configured to reflect, toward the semi-transmissive mirror, the image light from the semi-transmissive mirror to form an exit pupil, wherein an optical axis of the projection optical system is arranged in a direction intersecting a reference plane including an optical axis extending from the folding mirror to the semi-transmissive mirror and an optical axis extending from the concave surface mirror to the exit pupil, and a display region of the image light generation device is arranged inclined in accordance with inclinations of the folding mirror and the semi-transmissive mirror that are arranged.

DESCRIPTION OF EXEMPLARY EMBODIMENTS

First Exemplary Embodiment

With reference to the drawings, a virtual image display device and an optical unit embedded therein of a first exemplary embodiment of the present disclosure are described below.

Figure 1:
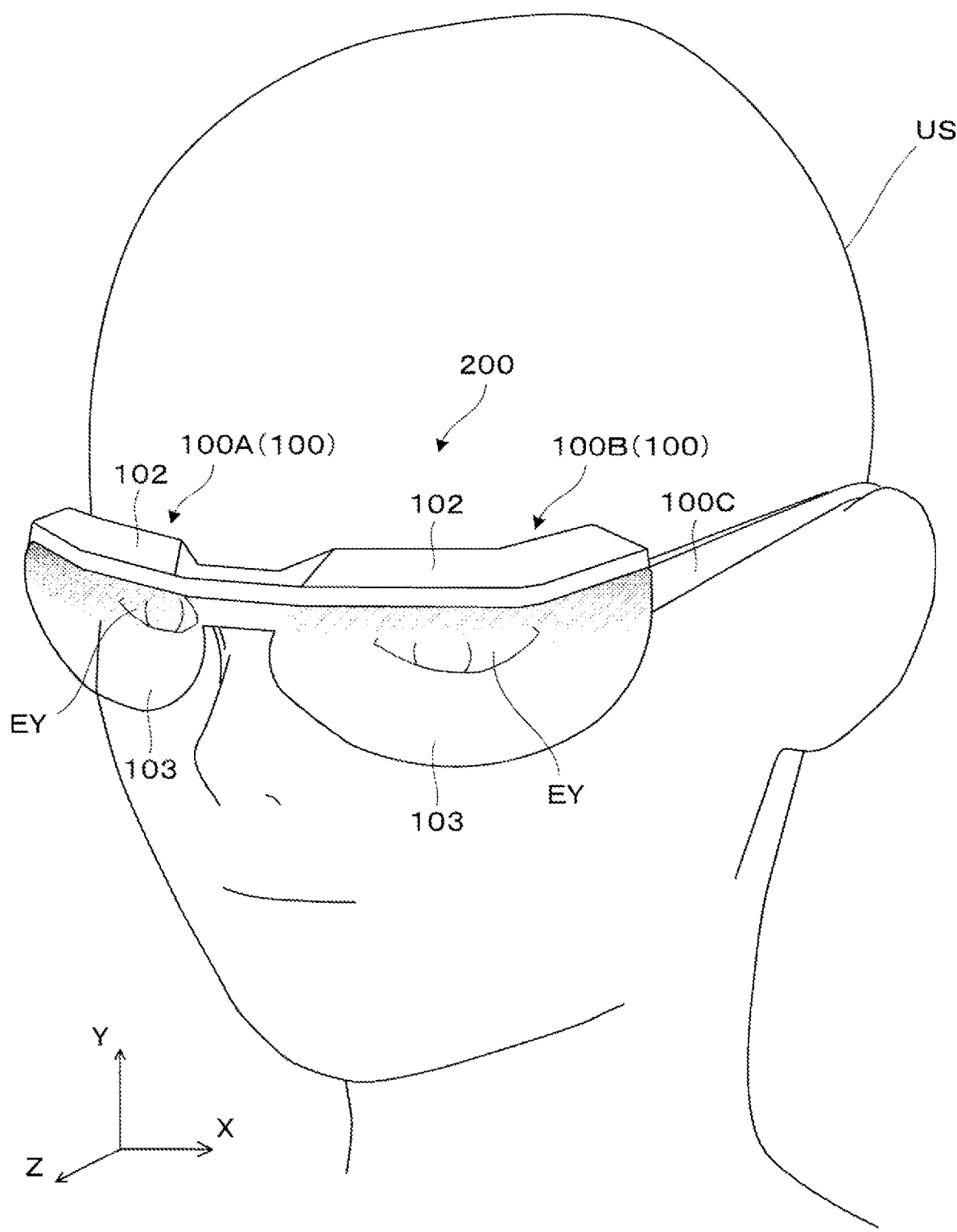
FIG. 1 is an appearance perspective view describing a mounting state of a virtual image display device of a first exemplary embodiment.

FIG. 1 is a perspective view describing appearance of a head-mounted display (hereinafter, also referred to as an HMD) 200, and an observer or wearer US who wears the HMD 200 is caused to visually recognize an image as a virtual image. In FIG. 1 and the like, X, Y, and Z are an orthogonal coordinate system, a +X direction corresponds to a lateral direction in which both eyes EY of the observer or wearer US wearing the HMD 200 or a virtual image display device 100 are aligned, a +Y direction corresponds to an upward direction orthogonal to the lateral direction in which both the eyes EY of the wearer US are aligned, and a +Z direction corresponds to a front direction of the wearer US or a front surface direction. The ±Y direction is parallel to a vertical axis.

The HMD 200 includes a first display device 100A for a right eye, a second display device 100B for a left eye, and temple-like support devices 100C that support the display devices 100A and 100B. The first display device 100A includes a display driving unit 102 arranged in an upper part and an appearance member 103 that has a spectacle lens shape and covers a front side of an eye. Similarly, the second display device 100B includes a display driving unit 102 arranged in an upper part and an appearance member 103 that has a spectacle lens shape and covers a front side of an eye. The support device 100C supports an upper end side of the appearance member 103 through intermediation of the display driving unit 102. The first display device 100A and the second display device 100B are obtained by inverting right and left optically. Hereinafter, the first display device 100A for a right eye is described as a representative for the virtual image display device 100.

Figure 2:
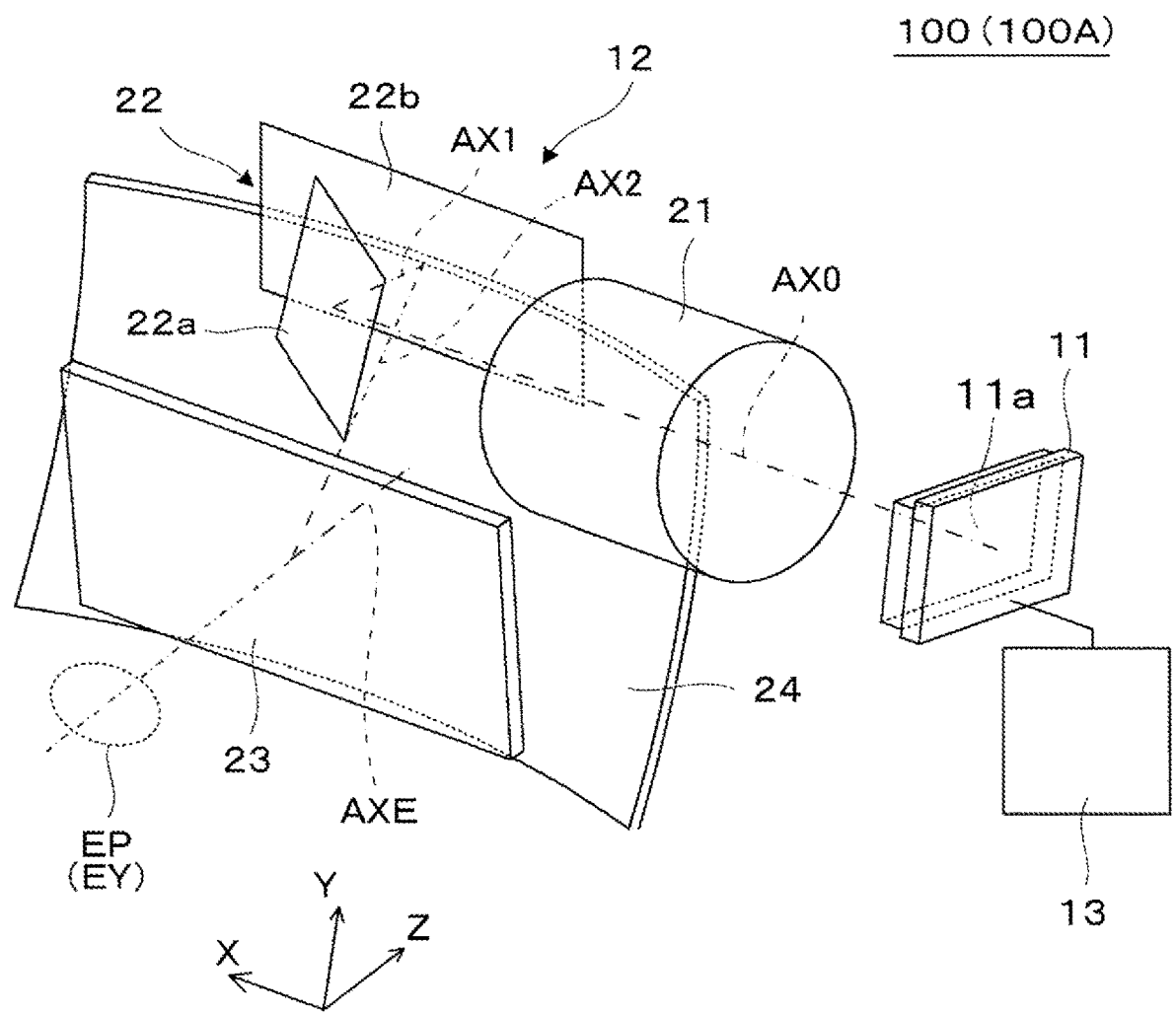
FIG. 2 is a schematic perspective view describing structures of the virtual image display device and the like in FIG. 1.
Figure 3:
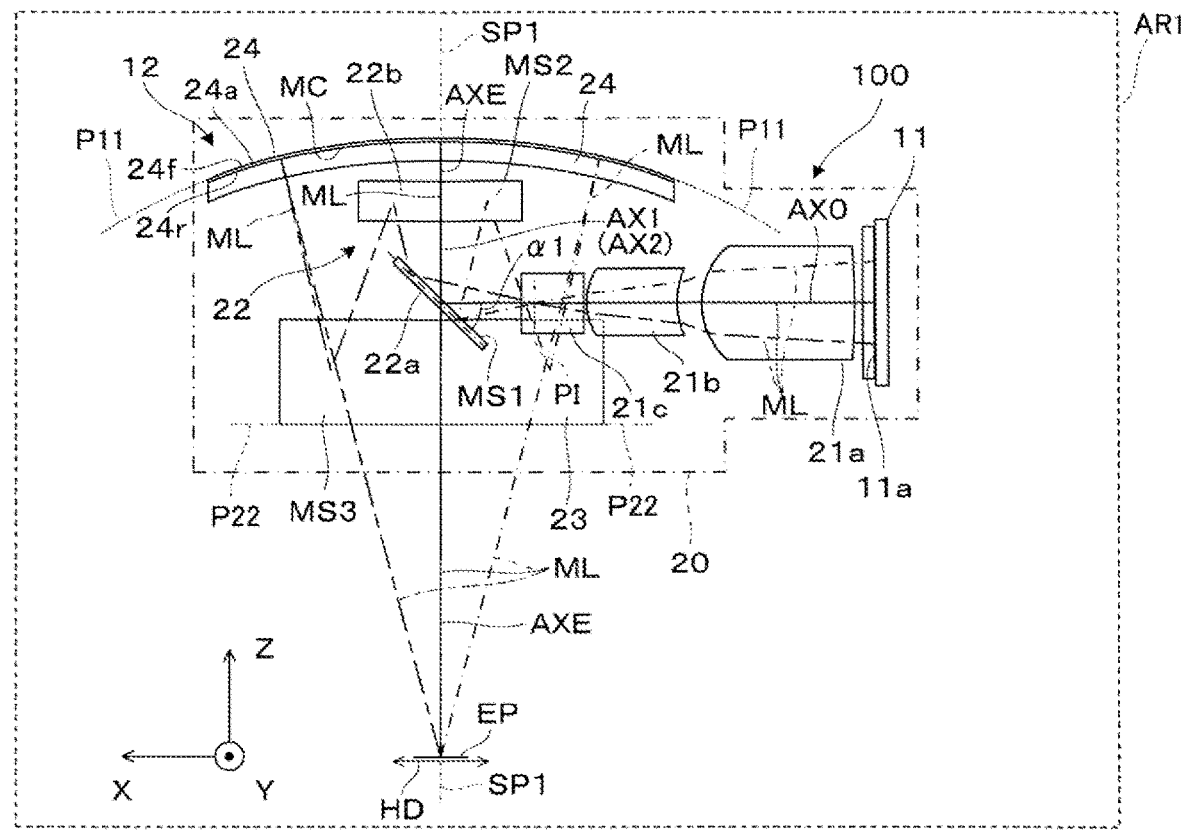
FIG. 3 is a plan view and a side view of the virtual image display device in FIG. 1.
Figure 3:
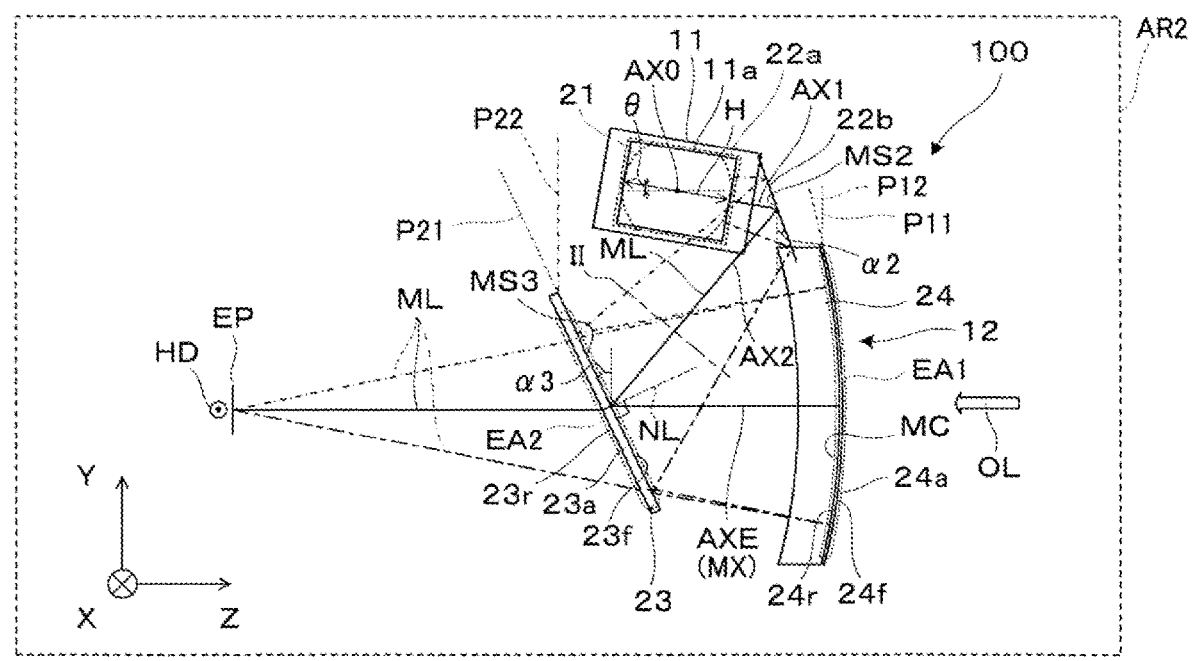

FIG. 2 is a perspective view describing the virtual image display device 100 being the display device 100A for a right eye, and FIG. 3 is a view describing an optical structure of the virtual image display device 100. In FIG. 3, a first region AR1 corresponds to a plan view of an image light generation device 11 and an optical unit 12, and a second region AR2 corresponds to a side view of the image light generation device 11 and the optical unit 12.

As illustrated in FIG. 2, the virtual image display device 100 includes the image light generation device 11, the optical unit 12, and a display control circuit 13. However, in the present specification, a configuration without the display control circuit 13, which achieves an optical function, is also referred to as the virtual image display device 100.

The image light generation device 11 is a self-luminous type display device typified by, for example, Organic Electro-Luminescence (organic EL), and forms a still image or a moving image in color on a two-dimensional display region 11a. The image light generation device 11 is driven by the display control circuit 13, and performs a display operation. As described later in detail, the display region 11a of the image light generation device 11 is arranged inclined in accordance with inclination of an optical path in the optical unit 12. In the illustrated example, the image light generation device 11 includes a display region inclined so as to rotate in a clockwise direction toward the +X direction, that is, when viewed from behind the image light generation device 11. The image light generation device 11 is not limited to organic EL, and may be replaced with an inorganic EL, an LED array, an organic LED, a laser array, a quantum dot light emitting type element, or the like. The image light generation device 11 is not limited to a self-luminous type display device. The image light generation device 11 may include an LCD or another light modulating element, and may form an image by illuminating the light modulating element with a light source such as a backlight. As the image light generation device 11, a liquid crystal on silicon (LCOS) (LCoS is a registered trademark), a digital micro-mirror device, and the like may be used instead of the LCD.

As illustrated in FIGS. 2 and 3, the optical unit 12 includes a projection optical system 21, a folding mirror 22, a semi-transmissive mirror 23, and a concave surface mirror 24. Here, an optical path from the image light generation device 11 to the folding mirror 22 is arranged above the semi-transmissive mirror 23. In the optical unit 12, a projection optical axis AX0 being an optical axis of the projection optical system 21 is arranged in a direction intersecting a reference plane SP1 being a virtual plane parallel to a YZ plane. The YZ plane includes a reflection optical axis AX2 being an optical axis extending from the folding mirror 22 to the semi-transmissive mirror 23 and an emission optical axis AXE being an optical axis extending from the concave surface mirror 24 to an exit pupil EP. The reference plane SP1 includes a normal line NL of the semi-transmissive mirror 23 and an axial line MX of the concave surface mirror 24. In the optical unit 12, for example, the reflection optical axis AX2 forms an angle with respect to the Y direction being a vertical direction, and the folding mirror 22 and the semi-transmissive mirror 23 form an optical path that is inclined, twisted, and bent. The projection optical axis AX0, the reflection optical axis AX2, and the emission optical axis AXE are axes through which a main light beam from the center of the display region 11a passes. The main light beam is included in image light ML emitted from the display region 11a of the image light generation device 11.

The projection optical system 21 projects the image light ML emitted from the image light generation device 11. The projection optical system 21 converges the image light ML emitted from the image light generation device 11 in such a way as to form an image, and simultaneously causes the image light ML to enter the folding mirror 22. The projection optical system 21 is not limited to a single lens. In the example illustrated in FIG. 3, three lenses 21a, 21b, and 21c are provided. However, the number of lenses may be two or four or more. The lenses 21a, 21b, and 21c are not limited to spherical lenses, and may be aspherical lenses. The projection optical axis AX0 being an optical axis of the projection optical system 21 extends in parallel to the lateral X-axis direction.

The folding mirror 22 includes a first mirror 22a and a second mirror 22b in this order in the optical path from the image light generation device 11. The folding mirror 22 reflects the image light ML from the projection optical system 21, in an intersecting direction. Here, the intersecting direction indicates a direction forming an angle larger than 0 degrees with respect to the projection optical axis AX0, and includes a direction in a twisted relationship. In a case of the present exemplary embodiment, the two mirrors 22a and 22b bend the optical path in a perpendicular direction in a twisted relationship. The semi-transmissive mirror 23 described later is arranged on a light emission side of the second mirror 22b. The semi-transmissive mirror 23 is also referred to as a third mirror. Before the folding mirror 22, that is, on the image light generation device 11 side in a direction opposite to an advancing direction of the image light ML, an incidence pupil PI of the virtual image display device 100 is arranged.

The first mirror 22a is a flat plate-shaped optical member, and includes a flat reflection surface MS1. The flat reflection surface MS1 of the first mirror 22a is formed of a metal film or a dielectric multilayer film. In this case, on a flat surface of a flat plate, a reflection film is formed by vapor deposition or the like. The reflection film is formed of a single layer film or a multilayer film formed of metal such as Al and Ag. The first mirror 22a bends the image light ML, which advances in the lateral X direction, in the front direction with the flat reflection surface MS1, and causes the image light ML to enter the second mirror 22b. In this case, the projection optical axis AX0 being an optical axis of the projection optical system 21 and a reflection optical axis AX1 from the first mirror 22a to the second mirror 22b intersect each other. The reflection optical axis AX1 extends in the +Z direction and the −Y direction along the YZ plane, and is obliquely inclined frontward and downward. The first mirror 22a is fixed to a frame of the display driving unit 102 illustrated in FIG. 1 with a member that is not illustrated.

When an XY plane extending in the vertical direction is regarded as a reference, the first mirror 22a or the flat reflection surface MS1 is in a state of being inclined at an angle α1 of 45 degrees in a clockwise direction about the Y axis with respect to the XY plane when viewed from above. A normal line of the flat reflection surface MS1 extends in a middle direction between the +Z direction and the −X direction, that is, in a direction at 45 degrees with respect to each of the +Z direction and the −X direction when viewed from above. Note that the first mirror 22a is also in a state of being inclined slightly downward toward the second mirror 22b about the X axis.

The second mirror 22b is a flat plate-shaped optical member, and includes a flat reflection surface MS2. The flat reflection surface MS2 of the second mirror 22b is formed of a metal film or a dielectric multilayer film. In this case, on a flat surface of a flat plate, a reflection film is formed by vapor deposition or the like. The reflection film is formed of a single layer film or a multilayer film formed of metal such as Al and Ag. The second mirror 22b bends the image light ML, which advances in the front direction, in a rear direction with the flat reflection surface MS2, and causes the image light ML to enter the semi-transmissive mirror 23 being the third mirror. In this case, the reflection optical axis AX1 from the first mirror 22a to the second mirror 22b and the reflection optical axis AX2 from the second mirror 22b to the semi-transmissive mirror 23 intersect each other. The reflection optical axis AX2 extends in the −Z direction and the −Y direction along the YZ plane, and is obliquely inclined rearward and downward. The second mirror 22b is fixed to a frame of the display driving unit 102 illustrated in FIG. 1 with a member that is not illustrated.

The second mirror 22b or the flat reflection surface MS2 is arranged in such a way that an angle formed with the XY plane being a plane perpendicular to the emission optical axis AXE being an axial line is smaller than 45 degrees. More specifically, when the XY plane extending in the vertical direction is regarded as a reference, the flat reflection surface MS2 is in a state of being inclined at an angle α2 approximately from 20 degrees to 40 degrees in a counter-clockwise direction about the X axis with respect to the XY plane, when viewed from the image light generation device 11, that is, in the +X direction. A normal line of the flat reflection surface MS2 is in a plane parallel to the YZ plane, and is in a state of being inclined more in the −Z direction than in the −Y direction by approximately 5 degrees to 25 degrees.

The semi-transmissive mirror 23 is a flat plate-shaped optical member that functions as a surface mirror having semi-transparency, and includes a flat reflection surface MS3. The semi-transmissive mirror 23 is the third mirror that reflects the image light ML from the second mirror 22b. The flat reflection surface MS3 of the semi-transmissive mirror 23 is obtained by forming a metal film or a dielectric multilayer film on one surface 23f of a parallel flat plate 23a having a uniform thickness and transparency. Reflectance and transmittance of the flat reflection surface MS3 are set to, for example, approximately 50%. Note that an anti-reflection film may be formed on the other surface 23r of the parallel flat plate 23a. The semi-transmissive mirror 23 bends the image light ML, which advances obliquely in the rear direction, in the front direction with the flat reflection surface MS3, and causes the image light ML to enter the concave surface mirror 24. In this case, the reflection optical axis AX2 from the second mirror 22b to the semi-transmissive mirror 23 and the emission optical axis AXE from the semi-transmissive mirror 23 to the concave surface mirror 24 intersect each other. The emission optical axis AXE matches with the axial line MX of the concave surface mirror 24, and extends in the front direction being the +Z direction. Here, generally, the axial line MX of the concave surface mirror 24 indicates a rotation symmetry axis of the concave surface mirror 24. For example, when the concave surface mirror 24 is deviated from a rotation symmetrical shape, the axial line MX of the concave surface mirror 24 passes through a cross point of the emission optical axis AXE and the concave surface mirror 24, and indicates a normal line of a tangent plane at the cross point with respect to the concave surface mirror 24. The semi-transmissive mirror 23 is arranged between the concave surface mirror 24 and the eye EY or the exit pupil EP at which an eye pupil is arranged, and covers the exit pupil EP. The semi-transmissive mirror 23 can be fixed directly or indirectly to a frame of the display driving unit 102 illustrated in FIG. 1, and a state in which an arrangement relationship with the concave surface mirror 24 and the like is set as appropriate can be achieved.

The semi-transmissive mirror 23 or the flat reflection surface MS3 is arranged in such a way that an angle formed with the XY plane being a plane perpendicular to the emission optical axis AXE being an axial line is smaller than 45 degrees. More specifically, when the XY plane extending in the vertical direction is regarded as a reference, the flat reflection surface MS3 is in a state of being inclined at an angle α3 approximately from 20 degrees to 40 degrees in a counter-clockwise direction about the X axis with respect to the XY plane when viewed in the image light generation device 11, that is, in the +X direction. The normal line NL of the flat reflection surface MS3 is in a plane parallel to the YZ plane, and is in a state of being inclined at approximately 20 degrees to 40 degrees in a counter-clockwise direction with respect to the Z axis. As described above, the semi-transmissive mirror 23 is arranged in such a way that an angle formed between the Y axis being a vertical axis and the semi-transmissive mirror 23 is smaller than 45 degrees. When the angle formed between the Y axis and the semi-transmissive mirror 23 is larger than 45 degrees, the semi-transmissive mirror 23 is in a fallen state as compared to a normal case, and hence the thickness of the semi-transmissive mirror in the Z-axis direction is advantageously increased. When the angle formed between the Y axis and the semi-transmissive mirror 23 is smaller than 45 degrees, the semi-transmissive mirror 23 is in an upright state as compared to a normal case, and hence the thickness of the semi-transmissive mirror in the Z-axis direction is reduced. As a result, that is, when the angle formed between the Y axis and the semi-transmissive mirror 23 is smaller than 45 degrees as in the present exemplary embodiment, the semi-transmissive mirror 23 can be prevented from being arranged to protrude largely in the −Z direction on the back side with respect to the concave surface mirror 24 as a reference. Thus, the thickness of the virtual image display device 100 or the optical unit 12 in the front-and-rear Z direction can be prevented from being increased.

The concave surface mirror 24 is a curved optical member that functions as a semi-transmissive surface mirror, and includes a concave reflection surface MC having a shape concave in the exit pupil EP. The concave reflection surface MC of the concave surface mirror 24 is obtained by forming a metal film or a dielectric multilayer film on one surface 24r of a curved plate-shaped body 24a having a uniform thickness and transparency. Reflectance of the flat reflection surface MS3 is set to, for example, approximately 20% to 50%. Note that an anti-reflection film may be formed on the other surface 24f of the plate-shaped body 24a. The concave reflection surface MC is not limited to a spherical surface, and may be an aspherical surface. The concave surface mirror 24 reflects the image light ML, which is reflected by the semi-transmissive mirror 23 and advances in the front direction, and returns the image light ML to the semi-transmissive mirror 23. Simultaneously, the concave surface mirror 24 causes the image light ML to partially pass through the semi-transmissive mirror 23, and converges the image light ML to the exit pupil EP. In this case, the emission optical axis AXE from the semi-transmissive mirror 23 to the concave surface mirror 24 matches with an emission optical axis that is folded back by the concave surface mirror 24 toward the exit pupil EP. The exit pupil EP is arranged at a conjugate position with the incidence pupil PI arranged before the folding mirror 22.

The concave surface mirror 24 is embedded in such a way as to constitute a part of the appearance member 103 illustrated in FIG. 1. Specifically, by providing a plate-shaped member with transparency or without transparency in the periphery of the concave surface mirror 24 in an extending manner, the appearance member 103 including the concave surface mirror 24 can be obtained. The appearance member 103 is not limited to a spectacle lens shape, and may have various contours or various types of appearance.

In the configuration described above, the second mirror 22b is not parallel to the semi-transmissive mirror 23. Specifically, the angle $\alpha 2$ being an inclination angle of the second mirror 22b is different from the angle $\alpha 3$ being an inclination angle of the semi-transmissive mirror 23. As a result, when focusing on the projection optical axis AX0 of the projection optical system 21, that is, when viewed along the projection optical axis AX0, a lateral axis H corresponding to a lateral direction of an image is rotated to form an inclination angle θ with respect to the horizontal Z direction. When the display region 11a of the image light generation device 11 is a rectangular shape as illustrated, the lateral axis H of the image corresponds to a lateral side of the rectangular shape. When focusing of the emission optical axis AXE passing through the exit pupil EP, that is, when viewed along the emission optical axis AXE, the lateral axis H of the image corresponds to a line HD extending in parallel to the X direction.

Figure 4:
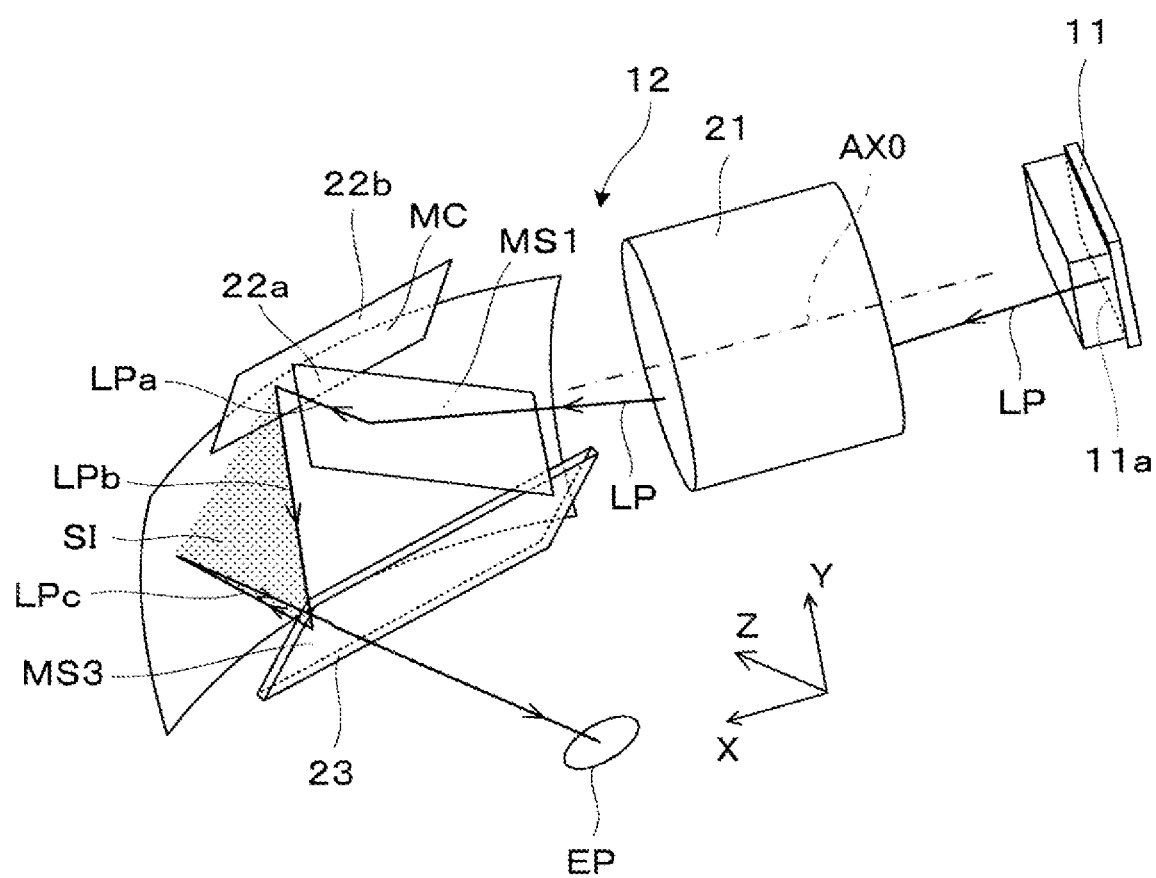
FIG. 4 is a perspective view describing inclination arrangement of an image light generation device.

With reference to FIG. 4, description is given on inclination arrangement in which the display region 11a of the image light generation device 11 is rotated about the projection optical axis AX0. Here, peripheral light LP, which is deviated from the projection optical axis AX0 and is emitted from a peripheral portion of the display region 11a, is the peripheral light LP is considered. When a light beam LPa from the first mirror 22a to the second mirror 22b is deviated from a plane SI including a light beam LPb from the second mirror 22b to the semi-transmissive mirror 23 and a light beam LPc from the semi-transmissive mirror 23 to the concave surface mirror 24, an image is rotated. In view of avoiding inclination of a virtual image to be observed, posture adjustment is required. In the posture adjustment, the image light generation device 11 or the display region 11a is rotated or inclined about the projection optical axis AX0 from normal arrangement along the coordinate axes.

Figure 5:
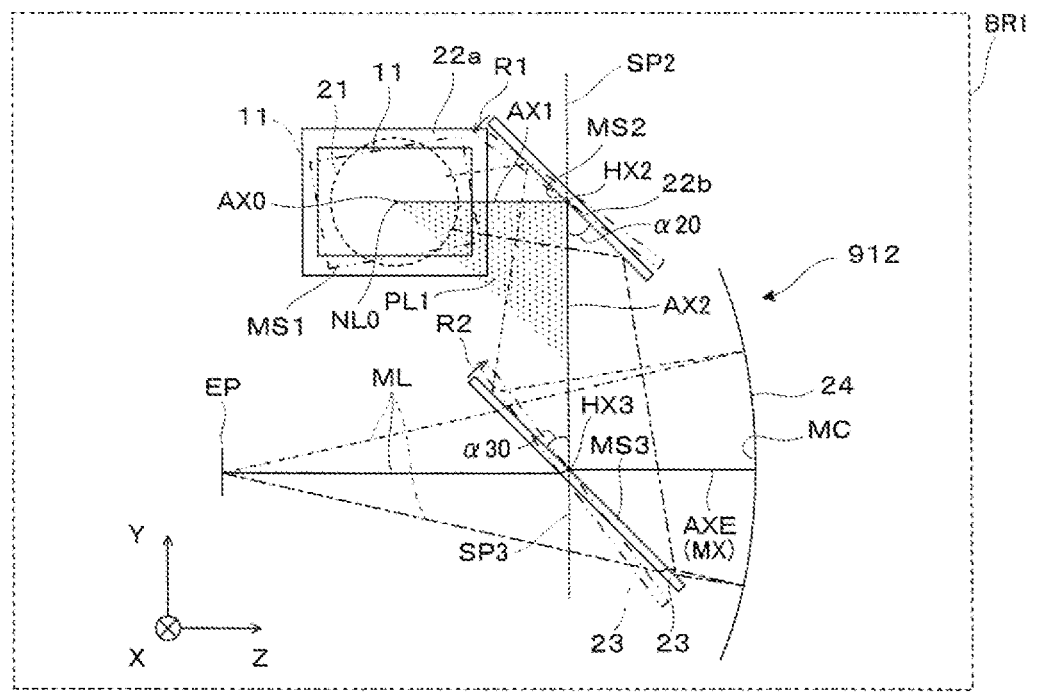
FIG. 5 is a view describing a relationship between inclination of a second mirror and the like and inclination arrangement of the image light generation device.
Figure 5:
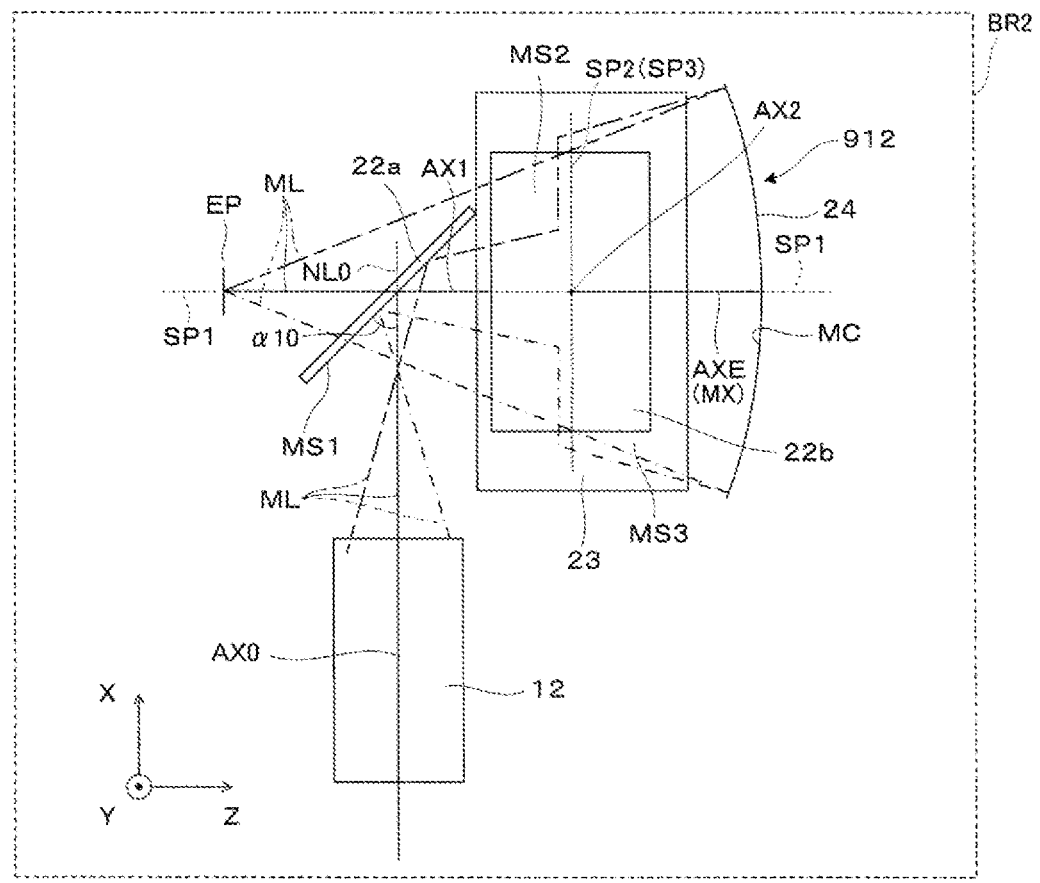

With reference to FIG. 5, how inclination of the second mirror 22b and the semi-transmissive mirror 23 affects a posture of the image light generation device 11 is described specifically. In FIG. 5, a first region BR1 corresponds to a side view of a general optical unit 12, and a second region BR2 corresponds to a plan view of the general optical unit 12. In the general optical unit 12, the first mirror 22a is in a state of being inclined at an angle $\alpha 10$ of 45 degrees with respect to the XY plane in such a way as to rotate in a clockwise direction about the Y axis when viewed from above. Moreover, the second mirror 22b is in a state of being inclined at an angle $\alpha 20$ of 45 degrees with respect to the XY plane in such a way as to rotate in a counter-clockwise direction about the X axis when viewed from the image light generation device 11 side. Further, the semi-transmissive mirror 23 is in a state of being inclined at angle $\alpha 30$ of 45 degrees with respect to the XY plane in such a way as to rotate in a counter-clockwise direction about the X axis when viewed from the image light generation device 11 side. Specifically, the second mirror 22b in the reference state as illustrated includes a plane SP2 perpendicular to the axial line MX of the concave surface mirror 24. The plane SP2 is in a state of being inclined at 45 degrees in a counter-clockwise direction about a horizontal axis HX2 extending perpendicular to the axial line MX toward the +X side. The semi-transmissive mirror 23 in the reference state as illustrated includes a plane SP3 perpendicular to the axial line MX of the concave surface mirror 24. The plane SP3 is in a state of being inclined at 45 degrees in a counter-clockwise direction about a horizontal axis HX3 perpendicular to the axial line MX toward the +X side. In the general optical unit 12 as described above, rotation of an image is not caused.

Here, when, as indicated with the two-dot chain line, the illustrated second mirror 22b is solely rotated downward in a counter-clockwise direction R1 about the X axis, an incident angle of the image light ML is small. Thus, the image light generation device 11 and the display region 11a are required to be rotated about the X axis in a counter-clockwise direction as indicated with the two-dot chain line. For example, when the second mirror 22b is rotated at 5 degrees in the counter-clockwise direction R1 about the X axis, the display region 11a of the image light generation device 11 is rotated at 10 degrees about the X axis in a counter-clockwise direction. With this, an image without inclination can be observed with the exit pupil EP. In contrast, when the second mirror 22b is solely rotated upward in a clockwise direction about the X axis, an incident angle of the image light ML is large. Thus, the image light generation device 11 and the display region 11a are required to be rotated about the X axis in a clockwise direction. Note that, in the description given above, translational movement of the display region 11a in the up-and-down direction or the ±Y direction is not considered.

Further, when, as indicated with the two-dot chain line, the illustrated semi-transmissive mirror 23 is solely rotated upward in a clockwise direction R2 about the X axis, an incident angle of the image light ML is small. The image light generation device 11 and the display region 11a are required to be rotated about the X axis in a counter-clockwise direction as indicated with the two-dot chain line. For example, in a case where the semi-transmissive mirror 23 is rotated at 5 degrees in the clockwise direction R2 about the X axis, when a posture of the second mirror 22b is not changed, the image light generation device 11 is rotated at 10 degrees in a counter-clockwise about the X axis. With this, an image without inclination can be observed with the exit pupil EP. In contrast, when the semi-transmissive mirror 23 is solely rotated downward in a counter-clockwise direction about the X axis, an incident angle of the image light ML is large. Thus, the image light generation device 11 and the display region 11a are required to be rotated about the X axis in a clockwise direction. Note that, in the description given above, translational movement of the display region 11a in the up-and-down direction or the ±Y direction is not considered.

Specifically, the second mirror 22b and the semi-transmissive mirror 23 are parallel to each other, an image without inclination can eventually be observed without rotating the image light generation device 11. In the present exemplary embodiment, as illustrated in FIG. 3, the angle α3 of the semi-transmissive mirror 23 and the angle α2 of the second mirror 22b are different from each other (α3>α2). Thus, the angle at which the second mirror 22b is rotated upward from the reference state illustrated in FIG. 5 is larger than the angle at which the semi-transmissive mirror 23 is rotated upward from the reference state illustrated in FIG. 5. With this, while improving flexibility in design of the optical path and reducing a space for the optical system, the display region 11a of the image light generation device 11 is rotated in a clockwise direction in such a way that the image light generation device 11 and the lateral axis H of the display region 11a form the inclination angle θ with respect to the horizontal Z direction, for the purpose of compensation. As a result, chipping in an image can be avoided, an entire screen of the display region 11a can be effectively utilized.

In the following description, how inclination of the projection optical axis AX0 of the projection optical system 21 affects a posture of the image light generation device 11 is described. First, even when the projection optical axis AX0 is rotated about the Y axis from the reference state, which is illustrated in FIG. 5, with a cross point with the first mirror 22a as a reference point, the display region 11a merely moves with the projection optical axis AX0 in the lateral direction along the horizontal XZ plane. Thus, inclination due to rotation about the projection optical axis AX0 is not caused. Meanwhile, when the projection optical axis AX0 is rotated about an axis that is not parallel to the Y axis, the display region 11a is rotated about the projection optical axis AX0. Thus, an image tends to be inclined. Specifically, there is provided a normal line of a plane PL1 including the reflection optical axes AX1 and AX2 before and after reflection at the second mirror 22b, and the normal line passes through a starting point of the reflection optical axis AX1 from the first mirror 22a (specifically, in a case of FIG. 5, the line corresponds to a normal line NL0 of the reference plane SP1 including the normal line NL of the semi-transmissive mirror 23 and the axial line MX of the concave surface mirror 24). When, with this line as a reference, the projection optical axis AX0 from the projection optical system 21 to the first mirror 22a has a component for being inclined and rotated about the reflection optical axis AX1 after reflection at the first mirror 22a, the display region 11a of the image light generation device 11 is required to be rotated in accordance with this inclination. For example, on the −X side, the image light generation device 11 rotates the projection optical axis AX0 to lower to the −Y side, which corresponds to clockwise rotation while facing the front. With this, the display region 11a is rotated in a clockwise direction while facing the +X direction. In contrast, on the −X side, the image light generation device 11 rotates the projection optical axis AX0 to rise to the +Y side, which corresponds to counter-clockwise rotation while facing the front. With this, the display region 11a is rotated in a counter-clockwise direction while facing the +X side.

Rotation or inclination of the display region 11a about the projection optical axis AX0, which is caused by a relative angle between the second mirror 22b and the semi-transmissive mirror 23, and rotation or inclination of the display region 11a about the projection optical axis AX0, which is caused by rotation of the projection optical axis AX0 about the reflection optical axis AX1, mutually act in an adding manner. Thus, those factors are collectively taken into consideration, and an inclination state of the display region 11a is set in such a way as to cancel inclination of an image at the position of the exit pupil EP. With this, image display with less inclination can be performed.

With reference to FIG. 3, an arrangement relationship of the folding mirror 22 with respect to the semi-transmissive mirror 23 and the concave surface mirror 24 is described. The folding mirror 22 is arranged between the semi-transmissive mirror 23 and the concave surface mirror 24. Specifically, the first mirror 22a and the second mirror 22b are arranged in a space having a wedge-shaped cross section between an extended plane P21 and a vertical cylinder-shaped curved plane P11. The extended plane P21 is obtained by virtually extending the flat reflection surface MS3 of the semi-transmissive mirror 23, and the vertical cylinder-shaped curved plane P11 is obtained by virtually extending an outer side of an upper end of the concave surface mirror 24 in the vertical Y direction. Further, in order to satisfy further preferably conditions, the first mirror 22a and the second mirror 22b are arranged between a vertical plane P22 and a secondary approximated curved plane P12. The vertical plane P22 is obtained by virtually extending am upper end of the flat reflection surface MS3 of the semi-transmissive mirror 23 in the vertical Y direction, and the approximated curved plane P12 is obtained by virtually extending the outer side of the upper end of the concave surface mirror 24. In the description given above, the space formed with the vertical cylinder-shaped curved plane P11, which is obtained by virtually extending the outer side of the upper end of the concave surface mirror 24 in the vertical Y direction, is referred to as the space having a wedge-shaped cross section. However, the space in which the folding mirror 22 is arranged depends on arrangement or shapes of the semi-transmissive mirror 23 and the concave surface mirror 24, and is not limited to a wedge-shaped cross section. The same holds true in other exemplary embodiments or a modification example.

It is desired that arrangement relationships of the projection optical system 21 and the image light generation device 11 with respect to the semi-transmissive mirror 23 and the concave surface mirror 24 be also similar to the folding mirror 22, but are limited in terms of a size such as a length of the projection optical system 21. It is desired that the projection optical system 21 and the image light generation device 11 be arranged in the space having a wedge-shaped cross section sandwiched between the extended plane P21 of the semi-transmissive mirror 23 and the vertical cylinder-shaped curved plane P11 that is set with respect to the concave surface mirror 24. When this structure is not easily achieved, it is desired that the projection optical axis AX0, which extends from the display region 11a of the image light generation device 11 to the folding mirror 22, be arranged between the extended plane P21 and the vertical cylinder-shaped curved plane P11. More preferably, it is desired that the projection optical system 21 and the image light generation device 11 be arranged between the vertical plane P22 that is set with respect to the semi-transmissive mirror 23 and the approximated curved plane P12 that is set with respect to the concave surface mirror 24. When this structure is not easily achieved, it is desired that the projection optical axis AX0, which extends from the display region 11a to the folding mirror 22, be arranged between the vertical plane P22 and the approximated curved plane P12.

The first mirror 22a and the second mirror 22b constituting the folding mirror 22 are arranged in such a way as to avoid blocking an effective region EA1 of the concave surface mirror 24 and an effective region EA2 of the semi-transmissive mirror 23. For example, the effective region EA1 is indicated with the dot line in the vicinity of the semi-transmissive mirror 23. Specifically, when viewed from the side, the position of the second mirror 22b is arranged on the image light generation device 11 side with respect to the effective region EA1, the effective region EA2, and a region formed by light beams of field angles on uppermost and lowermost ends of the image light ML reflected by the semi-transmissive mirror 23. In terms of optical design, it is easy to lower the second mirror 22b constituting the folding mirror 22 to the −Y side. However, when the second mirror 22b or the like is excessively lowered, a visual field from the exit pupil EP is interfered. As described above, when the folding mirror 22 is arranged in such a way as to avoid blocking the effective regions EA1 and EA2 of the concave surface mirror 24 and the semi-transmissive mirror 23, interference, which is caused by excessively lowering the folding mirror 22, can be prevented between the concave surface mirror 24 and the semi-transmissive mirror 23. Specifically, when viewed from the eye EY or the exit pupil EP of the wearer US, the folding mirror 22 is arranged not to block a field angle corresponding to an image region.

The optical path is described. The image light ML from the image light generation device 11 is converged to form an image by the projection optical system 21, is reflected sequentially by the first mirror 22a and the second mirror 22b of the folding mirror 22, and enters the semi-transmissive mirror 23. The image light ML, which is reflected by the semi-transmissive mirror 23 by, for example, approximately 50%, enters the concave surface mirror 24, and is reflected by the concave reflection surface MC at reflectance of approximately 50% or lower, for example. The image light ML reflected by the concave surface mirror 24 enters the exit pupil EP at which the eye EY or a pupil of the wearer US is arranged. An intermediate image II is formed between the semi-transmissive mirror 23 and the second mirror 22b. The intermediate image II is formed by enlarging an image as appropriate, which is formed on the display region 11a of the image light generation device 11. External light OL passing through the concave surface mirror 24 also enters the exit pupil EP. Specifically, the wearer US wearing the HMD 200 can observe a virtual image formed by the image light ML, which overlaps an external image.

In the virtual image display device 100 of the first exemplary embodiment described above, the display region 11a of the image light generation device 11 is arranged inclined in accordance with inclinations of the folding mirror 22 and the semi-transmissive mirror 23 that are arranged. Thus, even when inclination or rotation of an image is caused due to setting of the optical path, the display region 11a of the image light generation device 11 is arranged inclined in such a way as to compensate the inclination or rotation. With this, an image without inclination can be displayed for the wearer US.

Second Exemplary Embodiment

A virtual image display device and an optical unit embedded therein of a second exemplary embodiment are described below. The virtual image display device and the like of the second exemplary embodiment are obtained by partially modifying the virtual image display device and the like of the first exemplary embodiment, and description on common portions is omitted.

Figure 6:
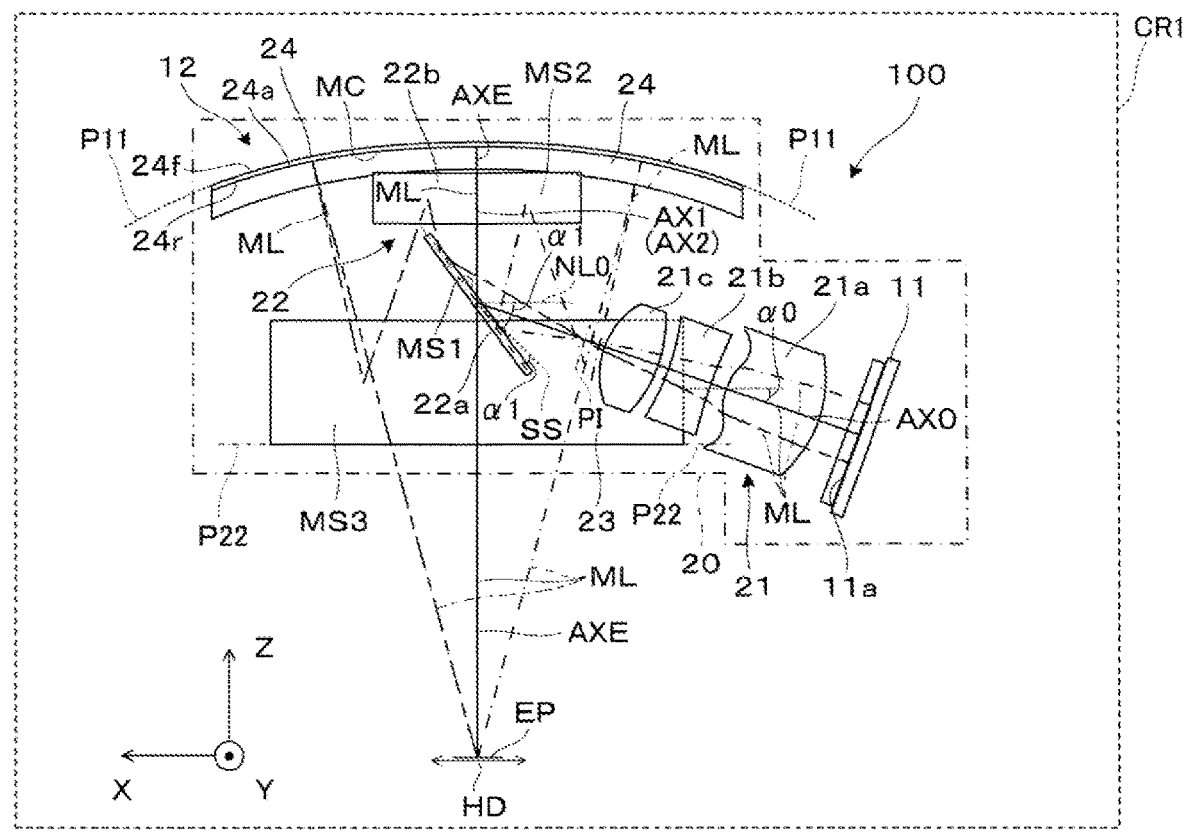
FIG. 6 is a plan view and a side view of a virtual image display device of a second exemplary embodiment.
Figure 6:
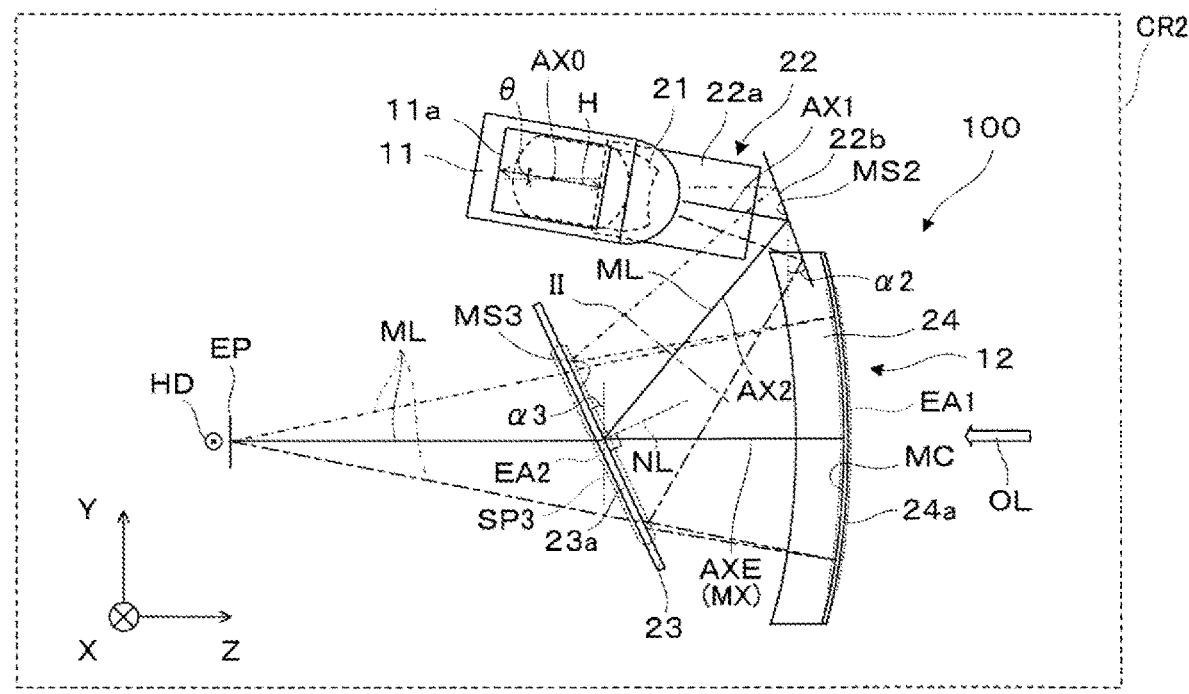

FIG. 6 is a view describing an optical structure of the virtual image display device 100 of the second exemplary embodiment. In FIG. 6, a first region CR1 corresponds to a plan view of the image light generation device 11 and the optical unit 12, and a second region CR2 corresponds to a side view of the image light generation device 11 and the optical unit 12.

In this case, the projection optical axis AX0 being an optical axis of the projection optical system 21 is in a state of being inclined at an angle α0 about the vertical Y axis in a clockwise direction with respect to the lateral X-axis direction about when viewed from above. In view of this, with a direction, which is inclined at 45 degrees about the Y axis with respect to the XY plane extending in the vertical direction, as a reference, the first mirror 22a or the flat reflection surface MS1 is in a state of being inclined at the angle α1, which is equivalent to a half of α0 (α1=α0/2), about the Y axis in a clockwise direction with respect to a reference plane SS when viewed from above.

In the virtual image display device 100 and the optical unit 12 of the second exemplary embodiment, the image light generation device 11 and the projection optical system 21 are arranged in such a way that the projection optical axis AX0 is inclined to the semi-transmissive mirror 23 side (that is, the −Z side) upstream of the optical path with respect to a normal line (a line parallel to the X axis) of a reference plane (the YZ plane) including the emission optical axis AXE matching with the normal line of the semi-transmissive mirror 23 and the axial line MX of the concave surface mirror 24.

In the configuration described above, when a direction in which the first mirror 22a is inclined at 45 degrees about the Y axis with respect to the XY plane is regarded as a reference, rotation is merely performed in a clockwise direction about the Y axis with respect to the reference plane SS when viewed from above. Similar to the case of the first exemplary embodiment, the image light generation device 11 and the like are rotated in a clockwise direction about the projection optical axis AX0 when viewed from behind. Thus, the image light generation device 11 and the lateral axis H of the display region 11a form the inclination angle θ with respect to the horizontal direction.

Third Exemplary Embodiment

A virtual image display device and an optical unit embedded therein of a third exemplary embodiment are described below. The virtual image display device and the like of the third exemplary embodiment are obtained by partially modifying the virtual image display device and the like of the first exemplary embodiment and the second exemplary embodiment, and description on common portions is omitted.

Figure 7:
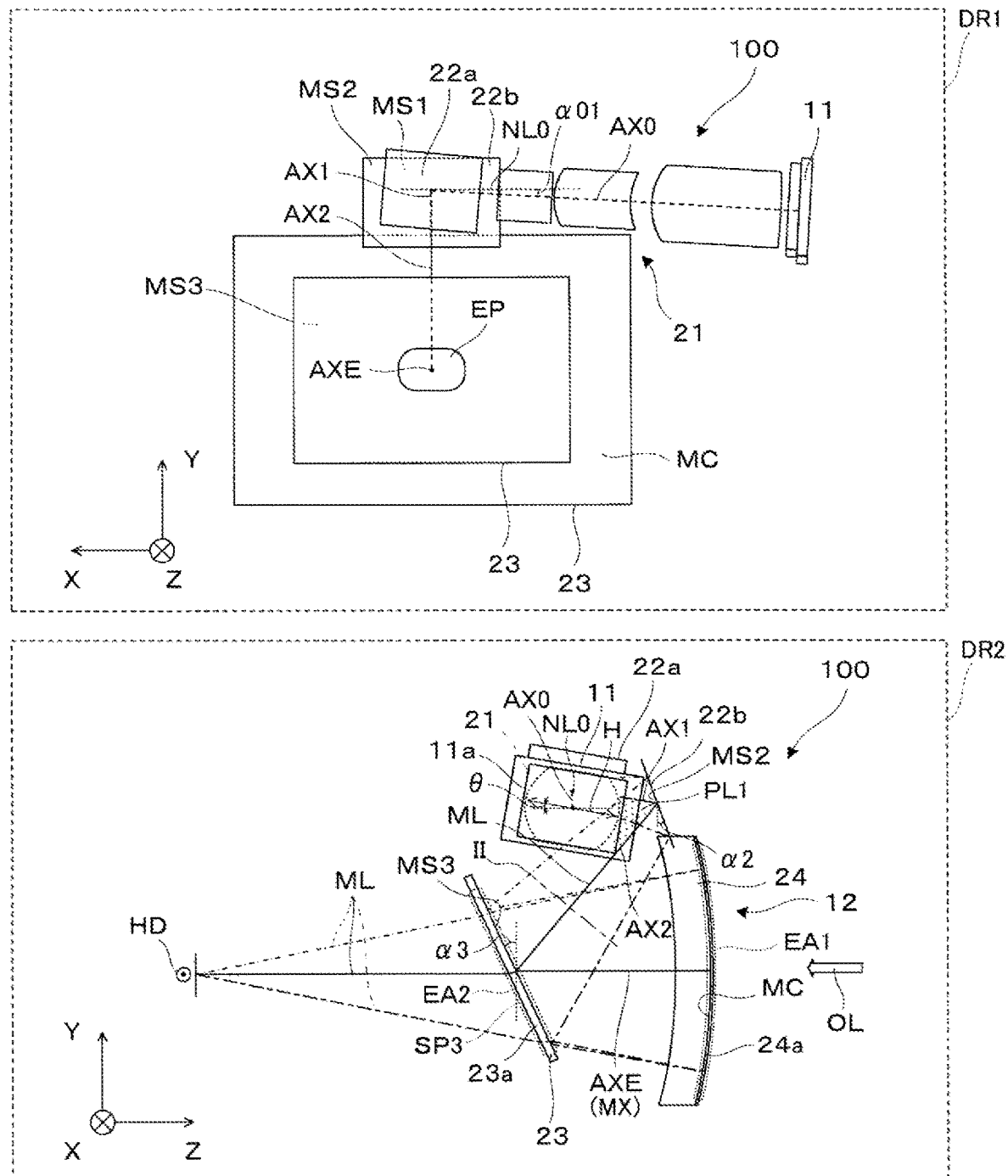
FIG. 7 is a plan view and a side view of a virtual image display device of a third exemplary embodiment.

FIG. 7 is a view describing an optical structure of the virtual image display device 100 of the third exemplary embodiment. In FIG. 7, a first region DR1 corresponds to a back view of the image light generation device 11 and the optical unit 12, and a second region DR2 corresponds to a side view of the image light generation device 11 and the optical unit 12.

In this case, when the lateral X-axis direction is regarded as a reference while facing the front from behind, the projection optical axis AX0 being an optical axis of the projection optical system 21 is in a state of being inclined at an angle α01 about the horizontal Z axis in a clockwise direction, and is in a state parallel to the lateral X-axis direction when viewed from above.

In the virtual image display device 100 and the optical unit 12 of the third exemplary embodiment, there is provided the normal line of a plane PL1 including the reflection optical axes AX1 and AX2 before and after reflection at the second mirror 22b, and the normal line passes through the starting point of the reflection optical axis AX1 from the first mirror 22a (specifically, in a case of FIG. 7, the line corresponds to the normal line NL0 of the reference plane SP1 including the normal line NL of the semi-transmissive mirror 23 and the axial line MX of the concave surface mirror 24). With this line as a reference, the projection optical axis AX0 from the projection optical system 21 to the first mirror 22a is inclined and rotated about the reflection optical axis AX1 after reflection at the first mirror 22a. An image is required to be rotated in the display region 11a of the image light generation device 11. Specifically, when the lateral X-axis direction is regarded as a reference while facing the front from behind, the projection optical axis AX0 is in a state of being inclined at the angle α01 about the horizontal Z axis in a clockwise direction, and the display region 11a is additionally required to be rotated finely in a counter-clockwise direction, while facing the +X side. As a result, similarly to the cases of the first exemplary embodiment and the second exemplary embodiment, the display region 11a of the image light generation device 11 is rotated about the projection optical axis AX0 in a clockwise direction when viewed from behind. Thus, the lateral axis H of the display region 11a of the image light generation device 11 forms the inclination angle θ with respect to the horizontal direction.

Fourth Exemplary Embodiment

A virtual image display device and an optical unit embedded therein of a fourth exemplary embodiment are described below. The virtual image display device and the like of the fourth exemplary embodiment are obtained by partially modifying the virtual image display device and the like of the first exemplary embodiment and the second exemplary embodiment, and description on common portions is omitted.

Figure 8:
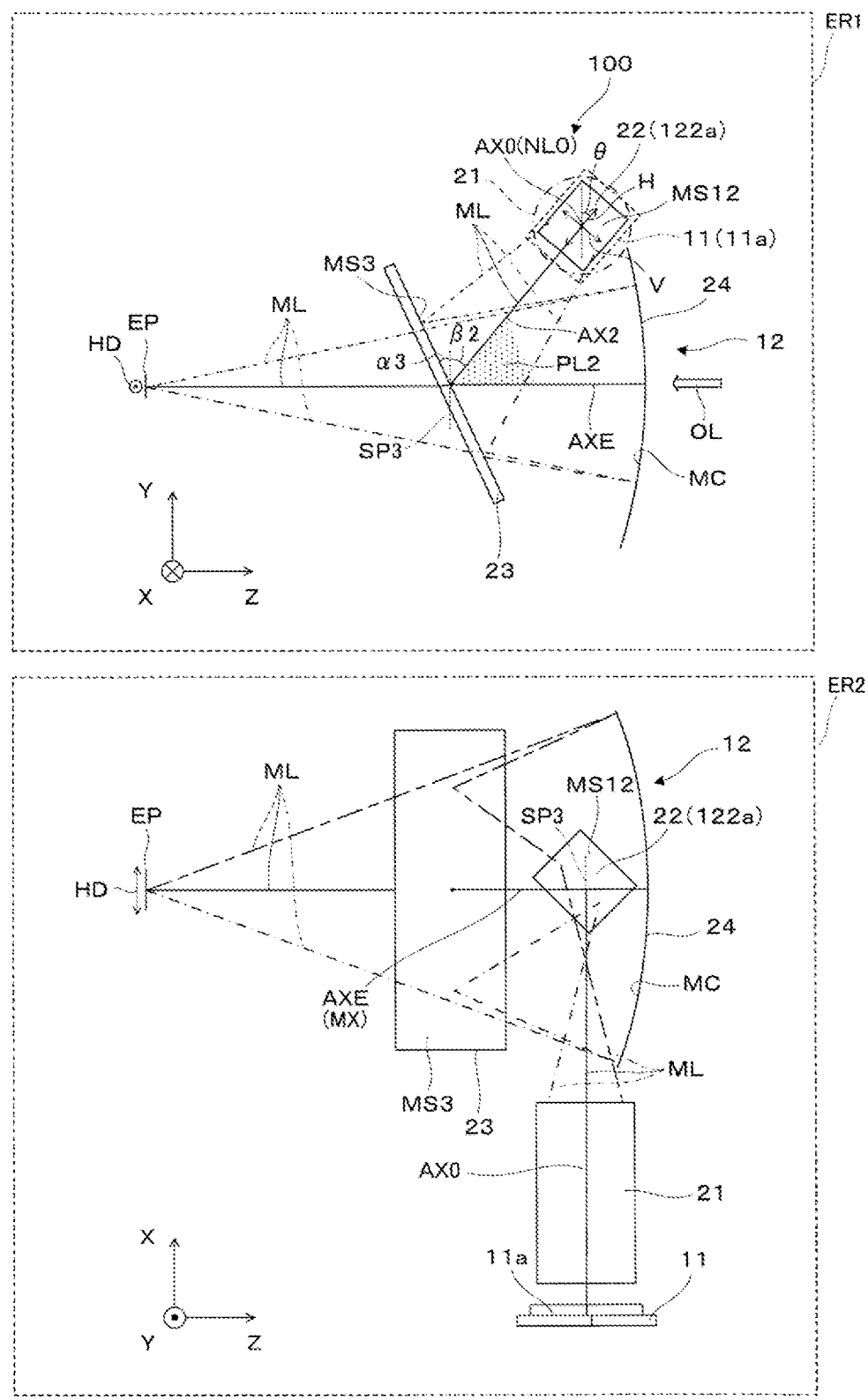
FIG. 8 is a plan view and a side view of a virtual image display device of a fourth exemplary embodiment.

FIG. 8 is a view describing an optical structure of the virtual image display device 100 of the fourth exemplary embodiment. In FIG. 8, a first region ER1 corresponds to a side view of the image light generation device 11 and the optical unit 12, and a second region ER2 corresponds to a plan view of the image light generation device 11 and the optical unit 12. In this case, the folding mirror 22 only includes a single mirror 122a. A normal line of a flat reflection surface MS12 of the mirror 122a extends in the −X direction, the −Y direction, and the −Z direction. The folding mirror 22 reflects the image light ML from the projection optical system 21, in an intersecting direction. Specifically, the projection optical axis AX0 of the projection optical system 21 extends in the X direction, the reflection optical axis AX2 from the folding mirror 22 to the semi-transmissive mirror 23 is set to be along the YZ plane in an oblique direction between the −Y direction and the −Z direction. In the optical unit 12, the reflection optical axis AX2 forms an angle with respect to the Y direction being a vertical direction, and the folding mirror 22 and the semi-transmissive mirror 23 form an optical path that is inclined, twisted, and bent.

In the optical unit 12 as described above, although not illustrated, the reference state of the semi-transmissive mirror 23 is a state of being inclined at the angle α3 of 45 degrees with respect to the plane SP3 perpendicular to the axial line MX of the concave surface mirror 24. Further, the reference state of the mirror 122a is a state in which, with the XY plane as a reference, the mirror 122a is rotated at 45 degrees about the Y axis in a clockwise direction with respect to the XY plane when viewed from above, and is rotated at 45 degrees about the X axis in a clockwise direction when viewed from the image light generation device 11 side and the display region 11a side. The normal line of the mirror 122a in the reference state is in a state of being inclined at 45 degrees in each of the −X direction, the −Y direction, and the −Z direction. In view of this, in the virtual image display device 100 of the fourth exemplary embodiment, the semi-transmissive mirror 23 is set to have the angle α3 approximately from 20 degrees to 40 degrees, and is arranged in a state of being inclined with respect to the reference being 45 degrees. As a result, the reflection optical axis AX2 from the mirror 122a to the semi-transmissive mirror 23 is inclined at an angle β, which is obtained by an expression of 90 degrees-2×α3, with respect to the standard Y axis. From the reference state as described above, the mirror 122a is in a state of being inclined upward about the X axis in a clockwise direction when viewed from the image light generation device 11 side and the like. When viewed along the projection optical axis AX0, although its original longitudinal direction is in the vertical Y direction, the lateral axis H corresponding to the lateral direction of the image is rotated to form the inclination angle θ with respect to the vertical Y direction. When focusing of the emission optical axis AXE passing through the exit pupil EP, that is, when viewed along the emission optical axis AXE, the lateral axis H of the image corresponds to a line HD extending in parallel to the X direction.

Note that it is assumed that the optical unit 12 is a general type in the reference state in which the semi-transmissive mirror 23 is inclined at the angle α3 of 45 degrees and the mirror 122a is inclined at 45 degrees with respect to each of the axis directions. Even when the mirror 122a is rotated about the front-and-rear Z axis in a clockwise direction or a counter-clockwise direction when viewed from behind, only a height position of the image is changed, and rotation of the image is not caused. Thus, there is no need to rotate the display region 11a of the image light generation device 11 about the projection optical axis AX0. Meanwhile, the mirror 122a is rotated about the vertical Y axis in, for example, a clockwise direction when viewed from above. With this, rotation of the image is caused. the display region 11a of the image light generation device 11 is required to be rotated about the projection optical axis AX0 in a clockwise direction when viewed from the image light generation device 11 side, in accordance with rotation of the mirror 122a. Specifically, when the mirror 122a is inclined at 5 degrees about the Y axis, the display region 11a is inclined at 7 degrees.

In the state illustrated in FIG. 8, the reflection optical axis AX2 is inclined with respect to the standard Y axis. Thus, even when the mirror 122a is rotated about an axis parallel to a vertical axis V perpendicular to the lateral axis H, there is no need to rotate the display region 11a of the image light generation device 11 about the projection optical axis AX0. However, when the mirror 122a is rotated about an axis parallel to the lateral axis H, the display region 11a of the image light generation device 11 is required to be rotated about the projection optical axis AX0. Specifically, there is provided a normal line of a plane PL2 including the reflection optical axis AX2 and the emission optical axis AXE before and after reflection at the semi-transmissive mirror 23, and the normal line passes through a starting point of the reflection optical axis AX2 from the mirror 122a (specifically, in a case of FIG. 8, the line corresponds to the normal line NL0 of the reference plane SP1 including the normal line NL of the semi-transmissive mirror 23 and the axial line MX of the concave surface mirror 24). When, with this line as a reference, the projection optical axis AX0 from the projection optical system 21 to the mirror 122a has a component for being inclined and rotated about the reflection optical axis AX2 after reflection at the mirror 122a, the image is required to be rotated in the display region 11a of the image light generation device 11 in accordance with this inclination.

Fifth Exemplary Embodiment

A virtual image display device and an optical unit embedded therein of a fifth exemplary embodiment are described below. The virtual image display device and the like of the fifth exemplary embodiment are obtained by partially modifying the virtual image display device and the like of the first exemplary embodiment, and description on common portions is omitted.

Figure 9:
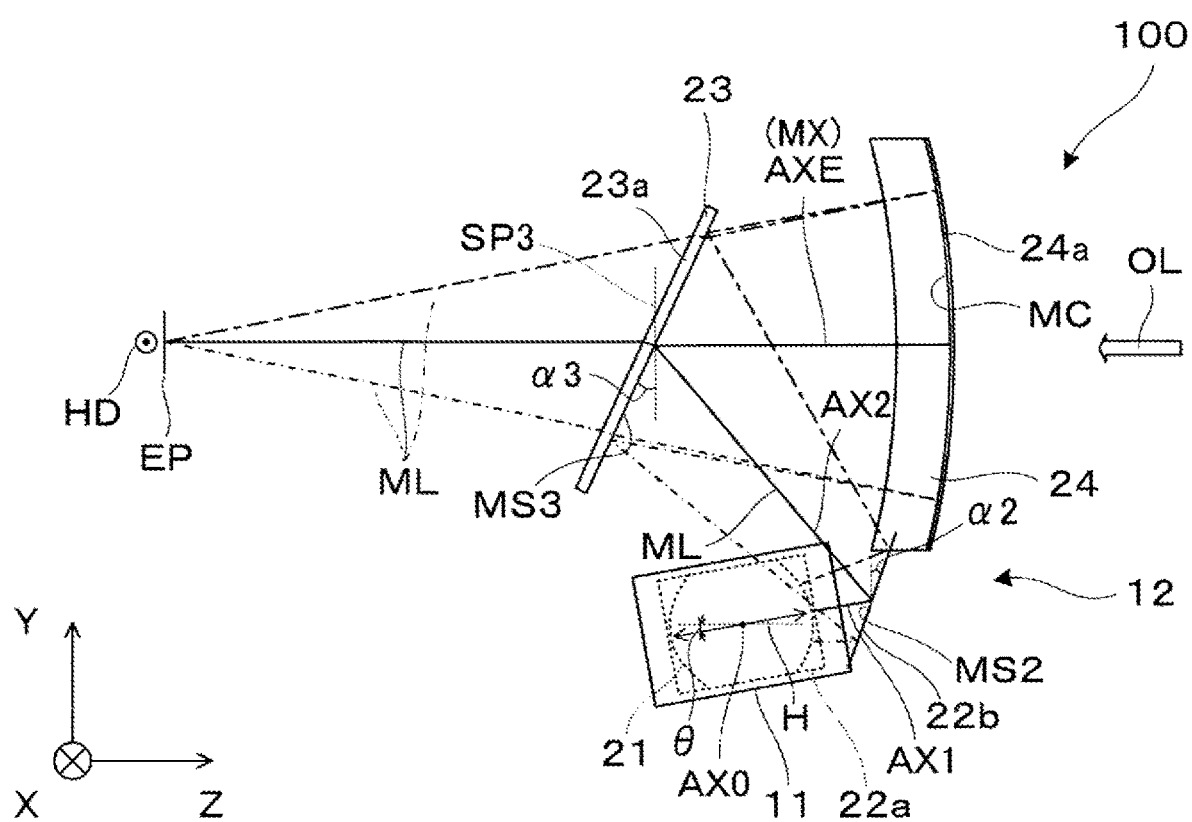
FIG. 9 is a side view of a virtual image display device of a fifth exemplary embodiment.

FIG. 9 is a view describing an optical structure of the virtual image display device 100 of the fifth exemplary embodiment. In this case, the virtual image display device 100 of the first exemplary embodiment is inverted upside down. As a result, the image light generation device 11, the projection optical system 21, and the folding mirror 22 are arranged below the semi-transmissive mirror 23 and the lower end of the concave surface mirror 24. Specifically, an optical path from the image light generation device 11 to the folding mirror 22 is arranged below the semi-transmissive mirror 23.

Sixth Exemplary Embodiment

A virtual image display device and an optical unit embedded therein of a sixth exemplary embodiment are described below. The virtual image display device and the like according the sixth exemplary embodiment are obtained by partially modifying the virtual image display device and the like of the fourth exemplary embodiment, and description on common portions is omitted.

Figure 10:
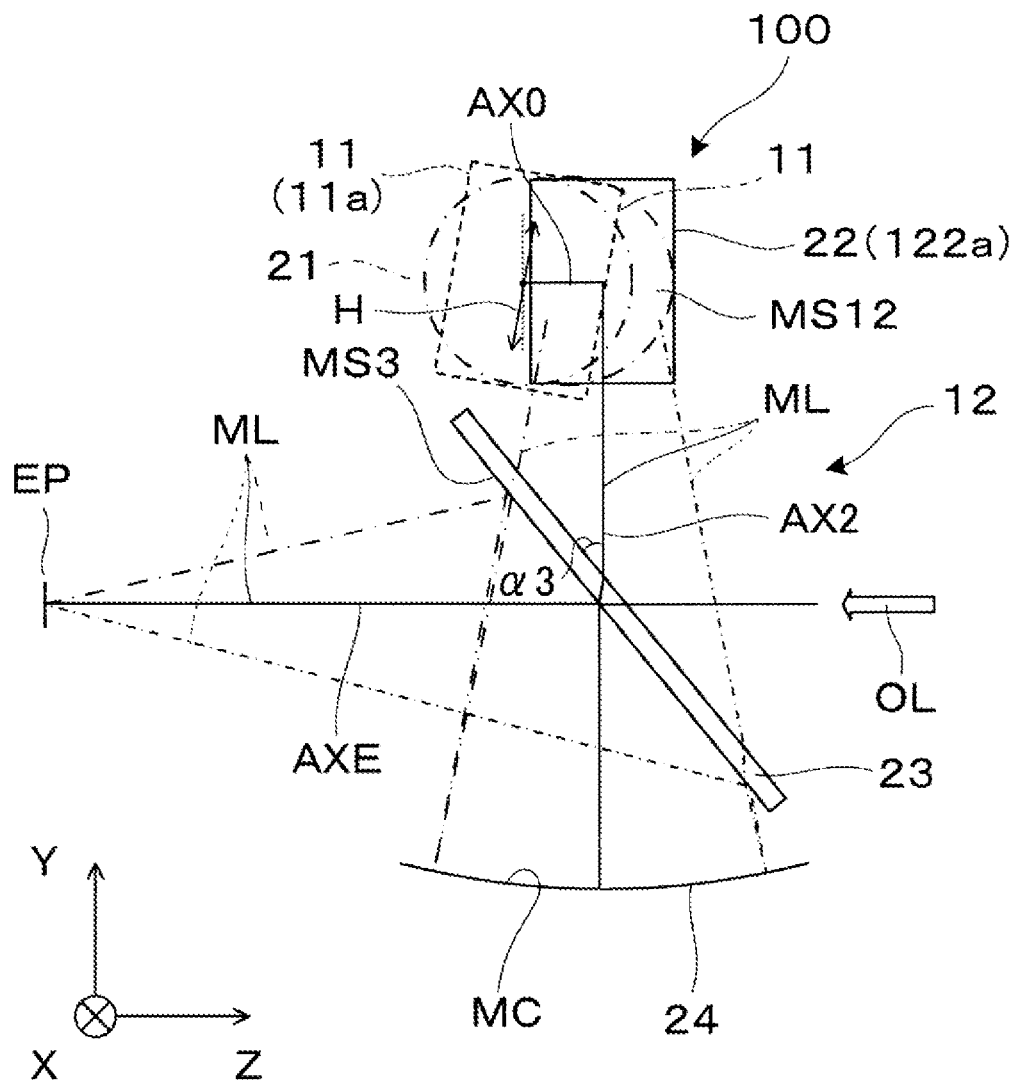
FIG. 10 is a side view of a virtual image display device of a sixth exemplary embodiment.

FIG. 10 is a view describing an optical structure of the virtual image display device 100 of the sixth exemplary embodiment. In this case, the concave surface mirror 24 is arranged below the semi-transmissive mirror 23.

The optical path is described. The image light ML from the image light generation device 11 passes through the projection optical system 21, is reflected by the single mirror 122a constituting the folding mirror 22, and enters the semi-transmissive mirror 23. The image light ML that partially passes through the semi-transmissive mirror 23 by approximately 50%, for example, enters the concave surface mirror 24, and is reflected by the concave reflection surface MC. The image light ML reflected by the concave surface mirror 24 is partially reflected by the semi-transmissive mirror 23, and enters the exit pupil EP at which the eye EY or a pupil of the wearer US is arranged. The external light OL passing through the concave surface mirror 24 also enters the exit pupil EP.

In this case, in a basic state, the semi-transmissive mirror 23 is inclined at the angle α3 of 45 degrees, and the mirror 122a is rotated at 45 degrees about the front-and-rear Z axis in a clockwise direction when viewed from behind. The projection optical axis AX0 is inclined in a clockwise direction with the −X direction as a reference when viewed from above, and rotation of an image is caused. Thus, the display region 11a of the image light generation device 11 is required to be rotate about the projection optical axis AX0 in accordance with rotation of the mirror 122a.

Modification Example and Others

The present disclosure is described according to the above-mentioned exemplary embodiments, but the present disclosure is not limited to the above-mentioned exemplary embodiments. The present disclosure may be carried out in various modes without departing from the gist of the present disclosure, and, for example, the following modifications may be carried out.

In the virtual image display device 100 of the exemplary embodiments described above, a self-luminous type display device such as an organic EL element, an LCD, or another light modulating element is used as the image light generation device 11. Instead, a configuration in which a laser scanner obtained by combining a laser light source and a scanner, such as a polygon mirror, may also be used as the image light generation device 11. Specifically, the present disclosure is applicable to a laser retina projection-type head-mounted display.

In FIGS. 2 and 3 and the like, the second mirror 22b is arranged as a member independent from the concave surface mirror 24. However, by devising adjustment of arrangement and the angle of the second mirror 22b or the like, the second mirror 22b may be coupled continuously from the concave surface mirror 24 to the upper side.

Figure 11:
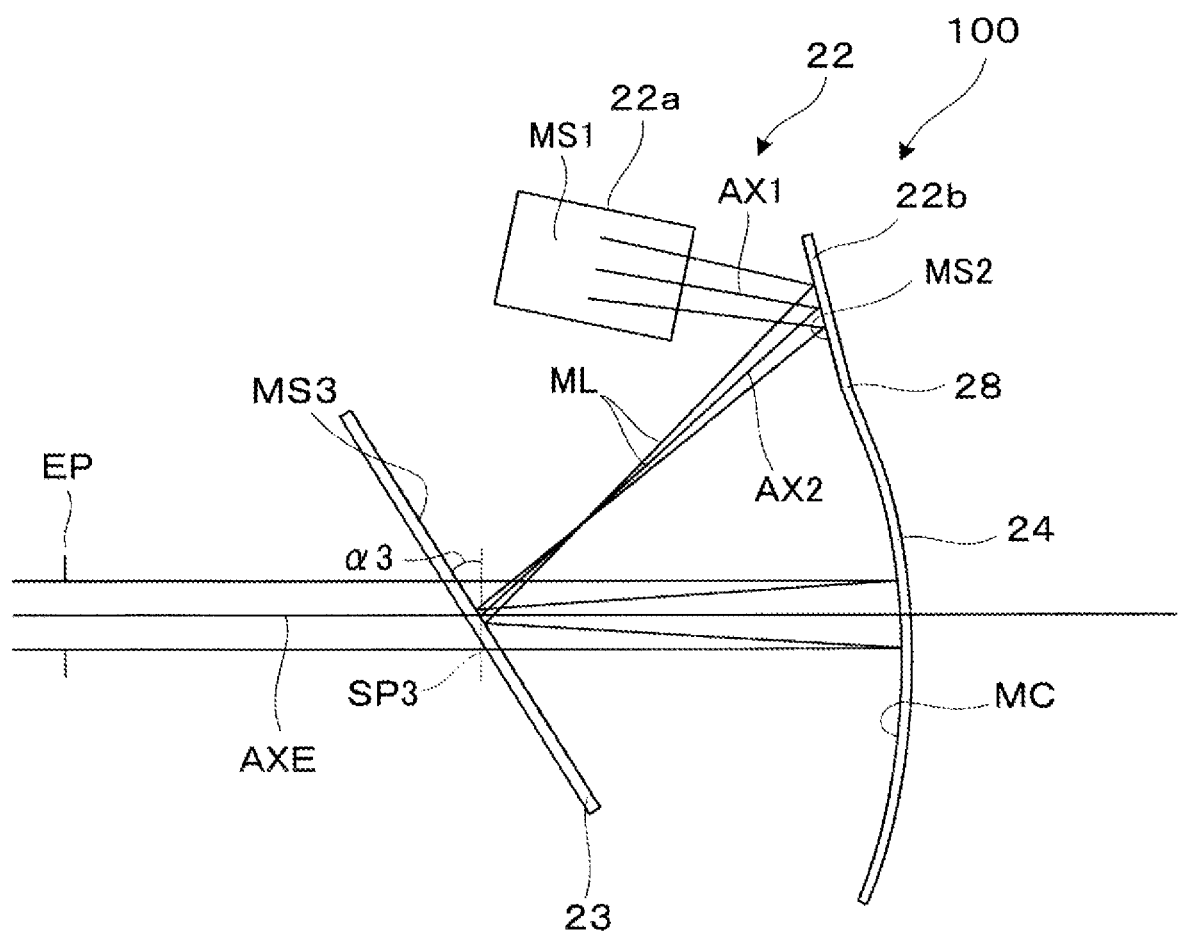
FIG. 11 is a side view describing a virtual image display device of a modification example.

As illustrated in FIG. 11, the second mirror 22b is coupled through intermediation with a coupling member 28 extending from the upper end of the concave surface mirror 24. The concave surface mirror 24, the second mirror 22b, and the coupling member 28 have substantially the same thickness. Further, the boundary between the concave surface mirror 24 and the coupling member 28 is smoothly deformed, and the boundary between the second mirror 22b and the coupling member 28 is smoothly deformed. In this case, the appearance member 103 illustrated in FIG. 1 may be an integrated member including the concave surface mirror 24 and the second mirror 22b.

In the exemplary embodiments described above, the emission optical axis AXE, which causes image light to enter the concave surface mirror 24 and to be reflected, extends in the horizontal direction or the X direction. Alternatively, the emission optical axis AXE may be set downward at a predetermined angle with respect to the horizontal direction when viewed from the semi-transmissive mirror 23 side.

A light control device that controls light by limiting light passing through the concave surface mirror 24 may be attached to the external side of the concave surface mirror 24. The light control device adjusts transmittance, for example, electrically. Mirror liquid crystals, electronic shades, electro-chromic elements, and the like may be used as the light control device. The light control device may adjust transmittance in accordance with external light brightness. When the light control device blocks the external light OL, only a virtual image that is not affected by an external image can be observed. Further, the virtual image display device of the disclosure of the present application is applicable to a so-called closed-type head-mounted display device (HMD) that blocks external light and causes only image light to be visually recognized. In this case, the HMD may also be compatible with a so-called see-through video product constituted by a virtual image display device and an imaging device.

The contour of the display region 11a of the image light generation device 11 is not limited to a rectangular shape, and may have various polygonal shapes such as a parallelogram, a triangle, and a hexagon. A circular shape and an elliptical shape can also be employed.

In the description above, it is assumed that the virtual image display device 100 is mounted and used on a head. However, the virtual image display device 100 described above may also be used a hand-held display similar to a pair of binoculars to be viewed thereinto, instead of being mounted on a head. In other words, the head-mounted display also includes a hand-held display in the present disclosure.

A virtual image display device according to a specific aspect includes an image light generation device, a projection optical system configured to project image light emitted from the image light generation device, a folding mirror configured to reflect the image light from the projection optical system, a semi-transmissive mirror configured to reflect or transmit part of the image light from the folding mirror, and a concave surface mirror configured to reflect, toward the semi-transmissive mirror, the image light from the semi-transmissive mirror to form an exit pupil, wherein an optical axis of the projection optical system is arranged in a direction intersecting a reference plane including an optical axis extending from the folding mirror to the semi-transmissive mirror and an optical axis extending from the concave surface mirror to the exit pupil, and a display region of the image light generation device is arranged inclined in accordance with inclinations of the folding mirror and the semi-transmissive mirror that are arranged.

In the virtual image display device described above, the display region of the image light generation device is arranged inclined in accordance with inclinations of the folding mirror and the semi-transmissive mirror that are arranged. Thus, even when inclination or rotation of an image is caused due to setting of the optical path, the display region of the image light generation device is arranged inclined in such a way as to compensate the inclination or rotation. With this, an image without inclination can be displayed.

In the specific aspect, the folding mirror includes a first mirror and a second mirror in this order in an optical path from the image light generation device, and the second mirror and the semi-transmissive mirror are arranged in a state of being inclined at different inclination angles with respect to a state in which the second mirror and the semi-transmissive mirror are each inclined at 45 degrees about a horizontal axis with respect to a plane perpendicular to an axial line of the concave surface mirror. In this case, an action of rotating an image about the optical axis of the image light generation device is caused, and the display region of the image light generation device is rotated or inclined to cancel the action.

In another aspect, the second mirror and the semi-transmissive mirror are arranged to form angles smaller than 45 degrees with respect to the plane perpendicular to the axial line. In this case, a width of the semi-transmissive mirror or the like in an emission optical axis direction is reduced, and hence thickness reduction of the virtual image display device is facilitated.

In further another aspect, the folding mirror includes a first mirror and a second mirror in this order in an optical path from the image light generation device, and when a normal line of a plane including optical axes before and after reflection at the second mirror, which passes through a starting point of an optical axis of the first mirror, is regarded as a reference, an optical axis extending from the projection optical system to the first mirror is inclined so as to rotate about an optical axis after reflection at the first mirror. In this case, an action of rotating an image about the optical axis of the image light generation device is caused, and the display region of the image light generation device is rotated or inclined to cancel the action.

In further another aspect, the second mirror and the concave surface mirror are integrally coupled to each other. In this case, the second mirror and the concave surface mirror can be supported easily, and hence an appearance member can be obtained by integrating the concave surface mirror and the second mirror.

In further another aspect, the folding mirror includes a single mirror, and the semi-transmissive mirror is arranged in a state of being inclined with respect to a reference, the reference being a state in which a plane perpendicular to an axial line of the concave surface mirror is inclined at 45 degrees about a horizontal axis perpendicular to the axial line. In this case, an action of rotating an image about the optical axis of the image light generation device is caused, and the display region of the image light generation device is rotated or inclined to cancel the action.

In further another aspect, the folding mirror includes a single mirror, and when a normal line of a plane including optical axes before and after reflection at the semi-transmissive mirror, which passes through a starting point of an optical axis extending from the single mirror, is regarded as a reference, an optical axis extending from the projection optical system to the single mirror is inclined so as to rotate about an optical axis after reflection at the single mirror. In this case, an action of rotating an image about the optical axis of the image light generation device is caused, and the display region of the image light generation device is rotated or inclined to cancel the action.

In further another aspect, an optical path from the image light generation device to the folding mirror is arranged above the semi-transmissive mirror. In this case, stylish arrangement can be achieved below the concave surface mirror.

In further another aspect, an optical path from the image light generation device to the folding mirror is arranged below the semi-transmissive mirror. In this case, stylish arrangement can be achieved above the concave surface mirror.

In further another aspect, the folding mirror is arranged to avoid blocking effective regions of the concave surface mirror and the semi-transmissive mirror. In this case, interference, which is caused by excessively lowering the folding mirror, can be prevented between the concave surface mirror and the semi-transmissive mirror.

In further another aspect, when an angle formed between the semi-transmissive mirror and the plane perpendicular to the axial line of the concave surface mirror is larger than an angle formed between the second mirror and the plane perpendicular to the axial line of the concave surface mirror, the display region of the image light generation device is arranged in a position rotated, with the optical axis of the projection optical system serving as a rotary axis, in a clockwise direction with respect to a plane parallel to the axial line of the concave surface mirror, and when an angle formed between the semi-transmissive mirror and the plane perpendicular to the axial line of the concave surface mirror is smaller than an angle formed between the second mirror and the plane perpendicular to the axial line of the concave surface mirror, the display region of the image light generation device is arranged in a position rotated, with the optical axis of the projection optical system serving as a rotary axis, in a counter-clockwise direction with respect to a plane parallel to the axial line of the concave surface mirror.

What is claimed is:

1. A virtual image display device, comprising:
an image light generation device;
a projection optical system configured to project image light emitted from the image light generation device;
a folding mirror configured to reflect the image light from the projection optical system;
a semi-transmissive mirror configured to reflect or transmit part of the image light from the folding mirror; and
a concave surface mirror configured to reflect, toward the semi-transmissive mirror, the image light from the semi-transmissive mirror to form an exit pupil, wherein
an optical axis of the projection optical system is arranged in a direction intersecting a reference plane including an optical axis extending from the folding mirror to the semi-transmissive mirror and an optical axis extending from the concave surface mirror to the exit pupil, and
a display region of the image light generation device is arranged inclined in accordance with inclinations of the folding mirror and the semi-transmissive mirror that are arranged, wherein
the folding mirror includes a first mirror and a second mirror in this order in an optical path from the image light generation device, and
the second mirror and the semi-transmissive mirror are arranged in a state of being inclined at different inclination angles with respect to a state in which the second mirror and the semi-transmissive mirror are each inclined at 45 degrees about a horizontal axis with respect to a plane perpendicular to an axial line of the concave surface mirror.

2. The virtual image display device according to claim 1, wherein
the second mirror and the semi-transmissive mirror are arranged to form angles smaller than 45 degrees with respect to the plane perpendicular to the axial line.

3. The virtual image display device according to claim 1, wherein
the second mirror and the concave surface mirror are integrally coupled to each other.

4. The virtual image display device according to claim 1, wherein
an optical path from the image light generation device to the folding mirror is arranged above the semi-transmissive mirror.

5. The virtual image display device according to claim 1, wherein
an optical path from the image light generation device to the folding mirror is arranged below the semi-transmissive mirror.

6. The virtual image display device according to claim 1, wherein
the folding mirror is arranged so as to avoid blocking effective regions of the concave surface mirror and the semi-transmissive mirror.

7. The virtual image display device according to claim 1, wherein
when an angle formed between the semi-transmissive mirror and the plane perpendicular to the axial line of the concave surface mirror is larger than an angle formed between the second mirror and the plane perpendicular to the axial line of the concave surface mirror, the display region of the image light generation device is arranged in a position rotated, with the optical axis of the projection optical system serving as a rotary axis, in a clockwise direction with respect to a plane parallel to the axial line of the concave surface mirror, and when an angle formed between the semi-transmissive mirror and the plane perpendicular to the axial line of the concave surface mirror is smaller than an angle formed between the second mirror and the plane perpendicular to the axial line of the concave surface mirror, the display region of the image light generation device is arranged in a position rotated, with the optical axis of the projection optical system serving as a rotary axis, in a counter-clockwise direction with respect to a plane parallel to the axial line of the concave surface mirror.

8. A virtual image display device, comprising:
an image light generation device;
a projection optical system configured to project image light emitted from the image light generation device;
a folding mirror configured to reflect the image light from the projection optical system;
a semi-transmissive mirror configured to reflect or transmit part of the image light from the folding mirror; and
a concave surface mirror configured to reflect, toward the semi-transmissive mirror, the image light from the semi-transmissive mirror to form an exit pupil, wherein
an optical axis of the projection optical system is arranged in a direction intersecting a reference plane including an optical axis extending from the folding mirror to the semi-transmissive mirror and an optical axis extending from the concave surface mirror to the exit pupil, and
a display region of the image light generation device is arranged inclined in accordance with inclinations of the folding mirror and the semi-transmissive mirror that are arranged, wherein
the folding mirror includes a first mirror and a second mirror in this order in an optical path from the image light generation device, and
an optical axis extending from the projection optical system to the first mirror is inclined so as to rotate about an optical axis after reflection at the first mirror, with respect to a normal line of a plane including optical axes before and after reflection at the second mirror, the normal line passing through a starting point of an optical axis from the first mirror.

9. A virtual image display device, comprising:
an image light generation device;
a projection optical system configured to project image light emitted from the image light generation device;
a folding mirror configured to reflect the image light from the projection optical system;
a semi-transmissive mirror configured to reflect or transmit part of the image light from the folding mirror; and
a concave surface mirror configured to reflect, toward the semi-transmissive mirror, the image light from the semi-transmissive mirror to form an exit pupil, wherein
an optical axis of the projection optical system is arranged in a direction intersecting a reference plane including an optical axis extending from the folding mirror to the semi-transmissive mirror and an optical axis extending from the concave surface mirror to the exit pupil, and
a display region of the image light generation device is arranged inclined in accordance with inclinations of the folding mirror and the semi-transmissive mirror that are arranged, wherein
the folding mirror includes a single mirror, and an optical axis extending from the projection optical system to the single mirror is inclined so as to rotate about an optical axis after reflection at the single mirror, with respect to a normal line of a plane including optical axes before and after reflection at the semi-transmissive mirror, the normal line passing through a starting point of an optical axis extending from the single mirror.

10. The virtual image display device according to claim 9, wherein the semi-transmissive mirror is arranged in a state of being inclined with respect to a reference, the reference being a state in which a plane perpendicular to an axial line of the concave surface mirror is inclined at 45 degrees about a horizontal axis perpendicular to the axial line.

\* \* \* \* \*